Patented Mar. 19, 1929.

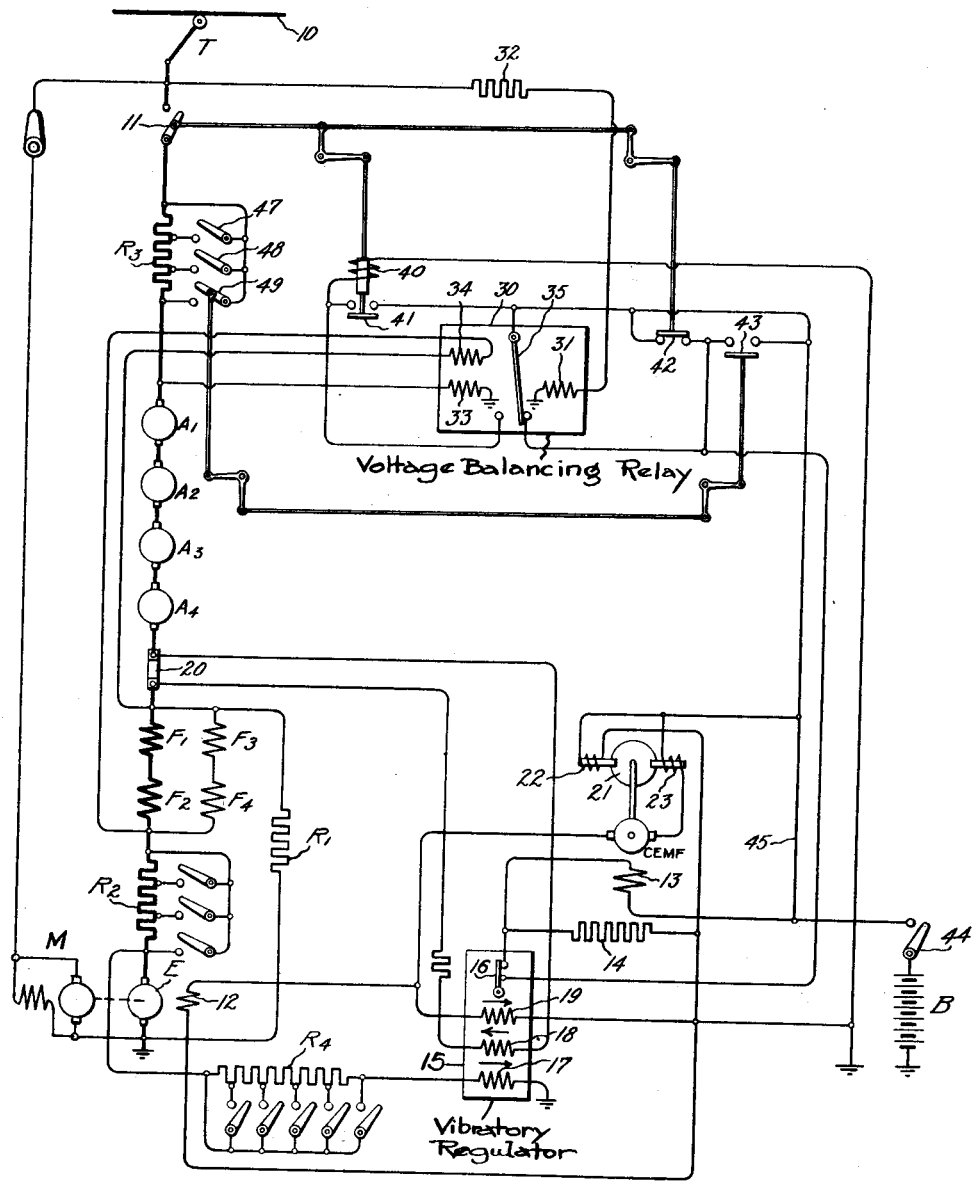

1,706,173

UNITED STATES PATENT OFFICE.

RUDOLPH D. KRAFE, OF SCHENECTADY, AND WILLIAM S. H. HAMILTON, OF LARCHMONT, NEW YORK, ASSIGNORS TO GENERAL ELECTRIC COMPANY, A CORPORATION OF NEW YORK.

ELECTRIC BRAKING.

Application filed May 25, 1927. Serial No. 194,206.

The invention relates to electric braking, particularly regenerative electric braking such as obtained on electric locomotives when the driving motors are excited to operate as load driven generators.

The principal object of the invention is to provide improved control apparatus for automatically initiating and controlling the regenerative braking operation of the motors.

More specifically the improved automatic control apparatus of the present invention is intended automatically to take care of many variable factors which are encountered in the regenerative braking operation of electric locomotives such, for example, as variations in the line potential, variations due to initiation of braking operation from rest and following motoring operation, variation due to single and multiple unit locomotive regenerative operation, variations in the speed of the braking generators due to differences in diameter of the driving wheels of multiple unit locomotives, as well as variations in the braking effect due to changes in the grade, all of which otherwise would require considerable attention and corresponding manipulation of the control apparatus by the operating engineer.

Briefly, the improved control apparatus of the present invention is arranged automatically to bring the motors into the proper condition for regenerative braking operation either starting from rest or following the motoring operation and with both single or multiple unit locomotive control. Furthermore all possibility of obtaining a dangerous or excessive regenerative voltage on the motors during the initiation of braking is effectively prevented. Moreover, the regenerative braking circuit is arranged to be established automatically only when the motor voltage is in proper relation with the existing line voltage to insure a smooth initiation of the braking operation. After the initiation of regenerative braking operation, the braking effect is automatically maintained substantially at a stable value that may be preselected by the engineer to meet the particular service conditions encountered irrespective of variations in line potential, grade, or minor variation in the speed of the generators.

In carrying the invention into effect, the regenerative braking operation is initiated under the automatic control of a voltage balancing relay responsive to both the line voltage and the regenerative voltage of the motors. The regenerative voltage of the motors is automatically regulated by controlling the exciter therefor through the agency of a counter E. M. F. device under the control of a regulator of the vibratory type which cooperates with the voltage balancing relay so as to prevent the regenerative voltage of the motors from becoming materially greater than the voltage of the line at any time. The counter E. M. F. device and vibratory regulator likewise serve to maintain the excitation of the motors at a selected value irrespective of variations in speed of the exciter for the motors, thereby greatly facilitating multiple unit operation of regenerative braking locomotives having separate motor generator sets for exciting the motors. The vibratory regulator and counter E. M. F. device function to automatically maintain the regenerative braking current at a selected value which may be varied at will by the operating engineer independently of the other variable factors previously noted.

The single figure of the accompanying drawing is a simplified circuit diagram of an electric locomotive regenerative braking control system embodying the improved control apparatus of the present invention. It will be understood that locomotives operated in multiple unit are provided with control systems duplicating that illustrated in the drawing.

As shown in the drawing the electric locomotive has four driving motors. The four motor armatures $A^1$ to $A^4$ are adapted to operate in series circuit as shown or in any other desired combination as load driven generators to return current to the power supply line 10 through the trolley T when the line switch 11 is closed and the corresponding field windings $F^1$ to $F^4$ of the motors are excited from the exciter E. The exciter E and the field winding $F^1$ $F^2$ and $F^3$ $F^4$ in parallel are in a closed excitation circuit including the fixed resistor $R^1$ and the adjustable resistor $R^2$. Resistor $R^1$ also is included in the regenerative braking circuit extending from the ground connection through the resistor $R^1$, the armatures of the motors $A^1$ to $A^4$ in series circuit, the adjustable resistors $R^3$ and the line switch 11 to the trolley T. Exciter E is driven by any suitable means preferably by a motor M energized from the supply line 10. The exciter field winding 12 is separately excited from a suitable supply source indicated as battery B in the drawing.

The exciting current of the field winding 12 is regulated by varying the counter voltage of the shunt wound motor C. E. M. F. having its armature connected in the excitation circuit for the exciter field winding. The shunt field winding 13 of the counter E. M. F. motor is energized from the battery B through a circuit including the protective resistor 14. An automatic regulator 15 having a vibratory contact 16, a main operating winding 17 and cooperating auxiliary windings 18 and 19 are provided for periodically effecting the short circuiting of field winding 13 of the counter E. M. F. motor in order to regulate the excitation of the exciter field winding 12. The main winding 17 of the regulator is connected to be energized in accordance with the voltage across the armature of the exciter E with an adjustable regulating resistor $R^4$ in circuit therewith. The regulator auxiliary winding 18 is energized in accordance with the current in the regenerative braking circuit through the agency of the shunt 20. The regulator auxiliary winding 19 functions as an anti-hunting winding and is connected across the armature of the C. E. M. F. motor. The regulator winding 19 acts cumulatively with respect to the main winding 17 while the current responsive winding 18 acts differentially with the main winding 17.

In order to maintain a substantially constant load on the counter E. M. F. motor an eddy current brake 21 is mechanically connected to be driven by the motor and is provided with the two retarding windings 22 and 23. Winding 22 is energized directly from the battery B while the winding 23 is connected in the armature circuit of the C. E. M. F. motor to be energized in accordance with the exciting current supplied to the exciter field winding $F^1$.

As will be pointed out more fully hereinafter, the initiation of regenerative braking operation is under the automatic control of the voltage balancing relay 30 having the winding 31 connected through the protective resistor 32 to the trolley T to be energized in accordance with the voltage of the line 10. The winding 33 of the balancing relay on the other hand is connected to be energized responsively to the regenerated voltage of the motors as indicated. The auxiliary winding 34 of the voltage balancing relay is connected across the field windings $F^1$ $F^2$ $F^3$ $F^4$ of the regenerative braking motors in order to compensate the action of the voltage responsive winding 33 during certain phases of operation.

The movable contact 35 of the voltage balancing relay 30 is double acting and in its left hand position controls the energization of the closing electro-magnet 40 of the line switch 11 and in its right hand position cooperates with the regulator 15 jointly to control the short circuiting of the C. E. M. F. motor field winding 13 preparatory to and during the initial phase of regenerative braking operation.

The functions of the several interlocking switch contacts 41, 42 and 43 and of the other control elements illustrated will be understood from the operation of the regenerative braking control system which is as follows:

Suitable controllers, which have been omitted from the drawing for the sake of clarity, are operated by the engineer to establish the motor and exciter connections as indicated. With the control elements in their respective positions, indicated in the drawing, regenerative braking operation is started by closing control switch 44 of the battery B. This results in energization of the exciter field winding 12 through a circuit extending from the battery B through switch 44, brake winding 23, armature of the C. E. M. F. motor, field winding 12, to ground. With the exciter armature in operation current is supplied by the exciter to the motor field winding $F^1$, $F^2$, and $F^3$, $F^4$ in series parallel relation as indicated, the adjustable resistor $R^2$ being included in the circuit.

When the motor armatures $A^1$–$A^4$ are driven by the load, the excitation of their respective field winding results in the motor armatures generating a voltage. This voltage is impressed upon the winding 33 of the balancing relay 30. At the same time the voltage of the exciter E is impressed upon the main winding 17 of the automatic regulator 15. The regulator contact 16 consequently is vibrated to open and close the short circuit around the field winding 13 of the C. E. M. F. motor and thereby vary the counter voltage of the motor so as to maintain the voltage of the exciter E at a value determined by the setting of the adjustable resistor $R^4$. The resistor $R^4$ is adjusted by the engineer to produce a desired regenerative braking effect corresponding to the service conditions encountered. With all of the resistor $R^4$ in circuit with the regulator operating winding 17, the braking effect is maintained at the maximum value while with all of the resistor $R^4$ removed from the circuit the minimum braking effect will be obtained.

In order, however, to prevent the generation of an excessive or dangerous motor voltage during the initiation of regenerative braking operation and before the line switch 11 is closed to complete the braking circuit, the voltage balancing relay 30 cooperates with the regulator 15 in controlling the short circuit around the field winding 13 of the C. E. M. F. motor. For example, in case the resistor R⁴ is adjusted to produce a voltage on the exciter E such that the resulting excitation of the motor field windings F¹ to F⁴ causes the regenerated voltage of the motors to exceed a predetermined value, the winding 33 of the voltage balancing relay 30 is sufficiently energized to predominate over the line voltage winding 31 and operate the relay contact 35 out of engagement with its right hand cooperating contact and into engagement with its left hand contact. The disengagement of the right hand relay contact insures that the short circuit around the C. E. M. F. motor field winding 13 is removed so that the counter voltage of the motor becomes effective to reduce the exciting current supplied to the exciter field winding 12. The reduced excitation of the exciter in turn reduces the excitation of the regenerative braking motors.

However, engagement of the contact 35 of the voltage responsive relay with its left hand contact completes an energizing circuit for the operating electro-magnet 40 of the line switch 11 through a circuit extending from the battery B through the control switch 44, conductor 45, contact 35, the operating winding 40 and thence to ground. Thereupon the line switch 11 is closed to connect the motor armatures A¹, A⁴ to the supply line 10 for regenerative braking operation with the resistor R³ in the braking circuit. Since the regenerative voltage of the motors is substantially equal to the line voltage there is no appreciable flow of either braking current or motoring current through the resistor R³ and the relay contact 35 returns to its right hand position. To increase the excitation of the motor field windings F¹—F⁴ to produce braking operation, the successive sections of the resistor R² are removed from the exciter circuit thereby permitting full excitation of the motor field windings in accordance with the voltage of the exciter E. As a result the regenerative voltage of the motor armatures A¹ to A⁴ is increased and the excitation of the winding 33 of the voltage balancing relay is correspondingly increased. The resistor R³ serves to limit the flow of regenerative braking current under these conditions.

Due to the resulting predominance of the motor voltage responsive winding 33 over the line voltage responsive winding 31, the relay contact 35 again is drawn out of engagement with its right hand contact thereby opening the short circuit on the shunt field winding of the C. E. M. F. motor. This permits the counter voltage of the motor to increase and reduce the excitation of the exciter field winding 12. The consequent reduction in exciter voltage decreases the excitation of the motor field windings F¹ to F⁴ with a corresponding reduction in the regenerative voltage of the motor armatures A¹ to A⁴. However, when the regenerative voltage of the motor approaches a balance with the line voltage, the contact 35 of the relay returns to its initial position thereby reestablishing the short circuit around the shunt field winding of the C. E. M. F. motor. In this way the contact 35 of the voltage balancing relay 30 is operated alternately to open and close the short circuit around the C. E. M. F. motor field winding so as to maintain the regenerated voltage of the motors substantially equal to the line voltage. Under these conditions the regulator 15 remains inactive.

With the motor and the line voltage substantially balanced, the current limiting resistor R³ may be shunted from the regenerative braking circuit by the successive operation of the switches 47, 48 and 49. Upon the closure of switch 49 the normally open auxiliary contact 43 thereof is closed, thus establishing a short circuit around the right hand contact of the voltage balancing relay 30. This transfers the automatic control of regenerative braking operation from the voltage balancing relay 30 to the regulator 15. The latter thereupon operates its contact 16 to periodically short-circuit the C. E. M. F. motor field winding 13 to maintain the voltage of the exciter E at the value determined by the adjustment of the resistor R⁴. The adjustment of the resistor R⁴, as previously pointed out, causes the regulator 15 automatically to maintain the exciter voltage at the proper value to produce the desired regenerative braking effect under the existing conditions of grade and other variable factors. With the exciter voltage at the selected value, the excitation of the motor field windings F¹—F⁴ produces the necessary voltage in the motor armatures A¹—A⁴ required to return the regenerative braking current to the supply line 10.

In case the voltage of the supply line 10 should vary and inversely vary the current returned thereto, the differential current responsive winding 18 of the regulator 15 cooperates with the main winding 17 to maintain stable regenerative braking operation of the motors. Thus should the voltage of the supply line 10 decrease so as to cause the braking current to increase, the regulator winding 18 functions to decrease the period during which the C. E. M. F. motor field winding is short circuited and increase the period during which this winding is not short-circuited and thereby lower the value at which the voltage of the exciter E is automatically maintained by the regulator 15. This at once reduces the regenerative voltage of the motors and consequently the value of the braking current. In case of an increase in the line voltage, the action of the winding 18 is reversed so that at all times the regenerative voltage of the motors is maintained in proper relation with the line voltage to produce the desired braking effect. It may be noted that upon a very rapid variation in the voltage of the line 10, the variation in voltage drop in the resistor $R^1$ inherently results in an increase or a decrease in the field excitation of the motors tending to correspondingly vary the motor voltage and thereby compensate for the voltage variation in the line.

From the foregoing it will be seen that the improvements of our present invention render the initiation of regenerative braking operation and the control thereof entirely automatic and independent of the many variable factors encountered during different conditions of operation. This materially reduces the opportunity for improper operation due to lack of attention or skill in the engineer and at all times insures a smooth transition into braking operation either starting from rest or following motoring operation.

What we claim as new and desire to secure by Letters Patent of the United States, is:

1. The combination of a regenerative braking dynamo-electric machine having a field winding, means for separately exciting said field winding to effect regenerative braking operation of said machine, automatic control means for the said separate exciting means including a variable voltage counter-electromotive force dynamo-electric machine, and an automatic regulator for regulating the excitation of said machine in accordance with predetermined braking conditions.

2. The combination of a regenerative braking dynamo-electric machine, an exciter for exciting said machine to effect regenerative braking operation thereof, means for separately exciting the exciter, and means including a variable voltage counter-electromotive force dynamo-electric machine controlled jointly in accordance with the exciter voltage and the regenerated current of said machine for regulating the excitation of said exciter.

3. The combination of a regenerative braking dynamo-electric machine having a field winding, an exciter for exciting said field winding to effect regenerative braking operation of said machine, means for separately exciting said exciter, a shunt-wound motor having its armature connected in the excitation circuit of said exciter, and an automatic regulator for controlling the shunt field winding of the motor to vary the counter voltage thereof in accordance with predetermined braking conditions.

4. The combination of a regenerative braking dynamo-electric machine having a field winding, an exciter for exciting said field winding to effect regenerative braking operation of said machine, a shunt-wound motor having its armature connected in the excitation circuit of said exciter, an automatic regulator having a vibratory contact for controlling a short circuit around the shunt field winding of said motor, an operating winding for said regulator energized in accordance with predetermined conditions in the braking circuit to vary the counter-electromotive force of the motor in accordance therewith, and means for varying the energization of said regulator winding independently of the electrical conditions in the braking circuit.

5. The combination of a regenerative braking dynamo-electric machine having a field winding, an exciter for exciting said field winding to effect regenerative braking operation of said machine, means for separately exciting said exciter, a shunt-wound motor having its armature connected in the excitation circuit of said exciter, an automatic regulator having a vibratory contact for controlling a short circuit around the shunt field winding of said motor, said regulator having an operating winding connected to be energized responsively to the voltage of said exciter, and a differential operating winding connected to be energized in accordance with the regenerative current of said dynamo-electric machine.

6. The combination of a regenerative dynamo-electric machine having a field winding, an exciter for exciting said field winding to effect said regenerative braking operation of said machine, means for separately exciting said exciter, a shunt-wound motor having its armature connected in the excitation circuit of said exciter, an automatic regulator having a vibratory contact for controlling a short circuit around the shunt field winding of said motor, said regulator having an operating winding connected to be energized responsively to the voltage of said exciter, and a differential operating winding connected to be energized in accordance with the regenerated current of said dynamo-electric machine, and means for varying the excitation of said first regulator operating winding independently of the voltage of said exciter to control the regenerative braking current of said machine.

7. In a regenerative braking system, the combination of a supply line, a load driven dynamo-electric machine having a field winding, a line switch for connecting said machine to said supply line for regenerative braking operation, an exciter for exciting said field winding, and means jointly responsive to the voltage of said supply line and the voltage of said dynamo-electric machine for automatically regulating said exciter to maintain the regenerated voltage of the machine substantially equal to the voltage of the supply line after closure of said line switch.

8. In a regenerative braking system, the combination of a supply line, a regenerative braking dynamo-electric machine having a field winding, a line switch for connecting said machine to said supply line for regenerating braking operation, an exciter for exciting said field winding, means for separately exciting said exciter, a shunt-wound motor having its armature connected in the excitation circuit of said exciter, and a voltage balancing relay for effecting the closure of said line switch when the regenerated voltage of said machine is in predetermined relation with the voltage of said supply line and for automatically controlling a short circuit around the shunt field winding of said motor thereafter.

9. In a regenerative braking system, the combination of a supply line, a regenerative braking dynamo-electric machine having a field winding, a line switch for connecting said machine to said supply line for regenerative braking operation, an exciter for exciting said field winding means jointly responsive to the voltage of said supply line and the regenerated voltage of said dynamo-electric machine for effecting the closure of said line switch when the regenerated voltage is in a predetermined relation with the line voltage and for automatically regulating said exciter to maintain the said voltage relation after closure of said line switch, and independent electro-responsive means controlled jointly in accordance with the exciter voltage and the regenerated current of said machine for automatically regulating said exciter independently of said voltage responsive means.

10. In a regenerative braking system, the combination of a supply line, a regenerative braking dynamo-electric machine having a field winding, a line switch for connecting said machine to said supply line for regenerative braking operation, an exciter for exciting said field winding, means for separately exciting said exciter, a voltage balancing relay for effecting closure of said line switch when the regenerated voltage of said machine is in a predetermined relation with the voltage of said supply line and for automatically controlling the separate excitation of said exciter thereafter, a resistor for limiting the regenerated current of said machine, means for short circuiting said resistor and rendering said voltage balancing relay ineffective to control the excitation of the said exciter, and an automatic regulator responsive to the regenerated current of said machine for automatically regulating the excitation of the said exciter after the short circuiting of said resistor.

11. In a regenerative braking system, the combination of a supply line, a regenerative braking dynamo-electric machine having a field winding, an exciter for said field winding, means for regulating said exciter comprising a voltage balancing relay jointly responsive to the voltage of said supply line and the regenerated voltage of said dynamo-electric machine, and an automatic regulator jointly responsive to the voltage of said exciter and the regenerated braking current of the machine, and connections through which the said voltage balancing relay and the said automatic regulator are separately rendered effective to control said exciter during different phases of regenerative braking operation.

12. In a regenerative braking system the combination of a supply line, a regenerative braking dynamo-electric machine having a field winding, a line switch for connecting said machine to said supply line for regenerative braking operation, an exciter for exciting said field winding, a resistor for limiting the regenerated current of the machine upon closure of the line switch, an exciter for exciting said field winding, means for separately exciting said exciter, a shunt-wound motor having its armature connected in the excitation circuit of said exciter, a voltage balancing relay for effecting the closure of said line switch when the regenerated voltage of said machine is in a predetermined relation with the voltage of said supply line and for automatically controlling a short circuit around the shunt field winding of said motor with said current limiting resistor in the braking circuit, means for short-circuiting said resistor and rendering said voltage balancing relay ineffective, an automatic regulator having a vibratory contact for controlling the short circuit around the shunt field winding of said motor, said regulator having an operating winding for said contact connected to be energized responsively to the voltage of said exciter, and a differential operating winding for said contact connected to be energized in accordance with the regenerated current of said dynamo-electric machine, and means for varying the excitation of said first regulator contact operating winding independently of the voltage of said exciter to control the regenerative braking current of said machine.

In witness whereof, we have hereunto set our hands respectively the 20th day of May, 1927, and the 21st day of May, 1927.

RUDOLPH D. KRAPE.
WILLIAM S. H. HAMILTON.